(12) United States Patent
Liang et al.

(10) Patent No.: US 12,154,530 B2
(45) Date of Patent: Nov. 26, 2024

(54) METHOD FOR ADJUSTING FRAME-LISTENING CYCLE, SHELF LABEL SYSTEM, AND COMPUTER DEVICE

(71) Applicant: HANSHOW TECHNOLOGY CO., LTD., Zhejiang (CN)

(72) Inventors: Min Liang, Zhejiang (CN); Yaping Ji, Zhejiang (CN); Qi Jiang, Zhejiang (CN); Yujing Wang, Zhejiang (CN); Shiguo Hou, Zhejiang (CN)

(73) Assignee: HANSHOW TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 18/527,186

(22) Filed: Dec. 1, 2023

(65) Prior Publication Data
US 2024/0105145 A1 Mar. 28, 2024

Related U.S. Application Data

(63) Continuation of application No. 18/208,227, filed on Jun. 9, 2023, now Pat. No. 11,915,672.

(30) Foreign Application Priority Data

Jun. 27, 2022 (CN) .......................... 202210732978.1

(51) Int. Cl.
*G09G 5/395* (2006.01)
*G06F 1/3231* (2019.01)

(52) U.S. Cl.
CPC ............ *G09G 5/395* (2013.01); *G06F 1/3231* (2013.01); *G09G 2330/021* (2013.01); *G09G 2380/04* (2013.01)

(58) Field of Classification Search
CPC .............. H04W 4/029; G09G 2380/04; G09G 2330/021; G09G 5/395
See application file for complete search history.

(56) References Cited

U.S. PATENT DOCUMENTS

| 5,910,653 A | 6/1999 | Campo |
| 6,331,971 B1 | 12/2001 | Raith |

(Continued)

FOREIGN PATENT DOCUMENTS

| CN | 103885599 A | 6/2014 |
| CN | 108260194 A | 7/2018 |

(Continued)

OTHER PUBLICATIONS

The First CNOA of Application No. 202210732978.1 dated on Aug. 12, 2022 with English translation, (13p).

(Continued)

*Primary Examiner* — Gerald Johnson
(74) *Attorney, Agent, or Firm* — Arch & Lake LLP

(57) ABSTRACT

Methods, systems and computer devices are provided for adjusting a frame-listening cycle. The method includes: configuring, by a server, a fixed frame-listening cycle of an electronic shelf label according to a time period; and sending, by the server, a second frame-listening cycle modification command through a base station when the server is to issue the fast response service during the low power consumption time period, so that the electronic shelf label modifies the current frame-listening cycle to a fast frame-listening cycle according to the second frame-listening cycle modification command. According to the present disclosure, the electronic shelf label can not only respond to the fast response service in real time, but also keep the low power consumption of a long frame-listening cycle, thereby simultaneously satisfying the requirements of high real-time performance and low power consumption of the electronic shelf label.

20 Claims, 3 Drawing Sheets

(56) References Cited

U.S. PATENT DOCUMENTS

| | | |
|---|---|---|
| 2008/0291855 A1 | 11/2008 | Bata et al. |
| 2011/0074552 A1 | 3/2011 | Norair et al. |
| 2011/0084951 A1 | 4/2011 | Karhuketo et al. |
| 2015/0278890 A1 | 10/2015 | Yang |
| 2017/0342731 A1 | 11/2017 | Virnes et al. |
| 2021/0282035 A1 | 9/2021 | Hiscock et al. |
| 2022/0292274 A1* | 9/2022 | Hou .................... G06Q 10/063 |

FOREIGN PATENT DOCUMENTS

| | | |
|---|---|---|
| CN | 112492674 A | 3/2021 |
| CN | 112601268 A | 4/2021 |
| CN | 112633031 A | 4/2021 |
| CN | 112788548 A | 5/2021 |
| CN | 113990188 A | 1/2022 |
| CN | 215495060 U | 1/2022 |
| CN | 114519409 A | 5/2022 |
| CN | 114554399 A | 5/2022 |
| CN | 114666878 A | 6/2022 |
| CN | 114828181 A | 7/2022 |
| JP | 2008011972 A | 1/2008 |
| JP | 2010206690 A | 9/2010 |
| JP | 2010227351 A | 10/2010 |
| JP | 2012100139 A | 5/2012 |
| WO | 2010084699 A1 | 7/2010 |
| WO | 2021022503 A1 | 2/2021 |

OTHER PUBLICATIONS

The Second CNOA of Application No. 202210732978.1 dated on Sep. 14, 2022 with English translation, (12p).
The International Search Report, and Written Opinion of the International Search Authority of PCT Application No. PCT/CN2023/091053 dated on Jul. 20, 2023, (8p).
Supplemental Search Report of CN2022107329781 issued by CNIPA (3p).
Office Action of Canadian Application No. 3,236,857 issue by Canadian Intellectual Property Office dated May 6, 2024, (3p).
Supplementary European Search Report issued in EP Application No. 23798864.7 dated Sep. 10, 2024, (10p).
JPOA issued in Application No. 2024-524485 dated Oct. 8, 2024, (4p).

* cited by examiner

METHOD FOR ADJUSTING FRAME-LISTENING CYCLE, SHELF LABEL SYSTEM, AND COMPUTER DEVICE

CROSS-REFERENCE TO RELATED APPLICATION

This application is a continuation application of U.S. patent application Ser. No. 18/208,227, filed on Jun. 9, 2023, which is filed based upon and claims priority to Chinese Patent Application No. 202210732978.1, filed on Jun. 27, 2022, the entire disclosure of which is incorporated herein by reference for all purposes.

TECHNICAL FIELD

The present disclosure relates to a field of communication technologies, and particularly, to a method for adjusting a frame-listening cycle, a shelf label system, and a computer device.

BACKGROUND

At present, large supermarkets around the world are undergoing digital upgrade and reconstruction. In digital applications, the electronic shelf label will replace the traditional paper label. In addition to displaying ordinary information, the electronic shelf label may also be used in many applications, such as quick picking, out-of-stock management, quick inventory, man-machine interaction with users, etc. Being limited by the battery capacity, the electronic shelf label is in a deep sleep state most of the time, and wakes up regularly to receive a radio frequency signal from a base station. The cycle of waking up regularly for reception is called as a frame-listening cycle. The overall service life of the electronic shelf label is related to the length of the frame-listening cycle. As the frame-listening cycle increases, more power is saved, and the service life of the electronic shelf label increases. However, as the frame-listening cycle increases, a delay for the electronic shelf label to respond to an application request also increases.

It can be seen that the electronic shelf label in the prior art has the problem that the requirements of high real-time performance and low power consumption cannot be satisfied simultaneously.

SUMMARY

In a first aspect, the present disclosure provides a method for adjusting a frame-listening cycle, which is applicable to a shelf label system including a server, a base station and an electronic shelf label. The method includes: configuring, by the server, a fixed frame-listening cycle of the electronic shelf label according to a time period, with the time period including a fast response time period for issuing a fast response service and a low power consumption time period for issuing a non-fast response service, and the fixed frame-listening cycle including a fast frame-listening cycle during the fast response time period and a low power consumption frame-listening cycle during the low power consumption time period; sending, by the server, a first frame-listening cycle modification command through the base station before the fast response time period or the low power consumption time period of the fixed frame-listening cycle, so that the electronic shelf label modifies a current frame-listening cycle according to the first frame-listening cycle modification command; and sending, by the server, a second frame-listening cycle modification command through the base station when the server is to issue the fast response service during the low power consumption time period, so that the electronic shelf label modifies the current frame-listening cycle to the fast frame-listening cycle according to the second frame-listening cycle modification command.

In a second aspect, the present disclosure provides a shelf label system, including a server, a base station and an electronic shelf label. The server is configured to configure a fixed frame-listening cycle of the electronic shelf label according to a time period, with the fixed frame-listening cycle including a fast frame-listening cycle during a fast response time period and a low power consumption frame-listening cycle during a low power consumption time period. The server is configured to send a first frame-listening cycle modification command through the base station before the fast response time period or the low power consumption time period of the fixed frame-listening cycle, so that the electronic shelf label modifies a current frame-listening cycle according to the first frame-listening cycle modification command. The server is configured to send a second frame-listening cycle modification command through the base station when the server is to issue a fast response service during the low power consumption time period, so that the electronic shelf label modifies the current frame-listening cycle to the fast frame-listening cycle according to the second frame-listening cycle modification command.

In a third aspect, the present disclosure provides a computer device, including a memory, a processor and a computer program stored in the memory and executable on the processor. When being executed by the computer program, the processor implements the steps of: configuring, by a server, a fixed frame-listening cycle of an electronic shelf label according to a time period, with the time period including a fast response time period for issuing a fast response service and a low power consumption time period for issuing a non-fast response service, and the fixed frame-listening cycle including a fast frame-listening cycle during the fast response time period and a low power consumption frame-listening cycle during the low power consumption time period; sending, by the server, a first frame-listening cycle modification command through a base station before the fast response time period or the low power consumption time period of the fixed frame-listening cycle, so that the electronic shelf label modifies a current frame-listening cycle according to the first frame-listening cycle modification command; sending, by the server, a second frame-listening cycle modification command through the base station when the server is to issue the fast response service during the low power consumption time period, so that the electronic shelf label modifies the current frame-listening cycle into a fast frame-listening cycle according to the second frame-listening cycle modification command.

In a fourth aspect, the present disclosure provides a non-transitory readable storage medium storing a computer program. When being executed by a processor, the computer program implements the steps of: configuring, by a server, a fixed frame-listening cycle of an electronic shelf label according to a time period, with the time period including a fast response time period for issuing a fast response service and a low power consumption time period for issuing a non-fast response service, and the fixed frame-listening cycle including a fast frame-listening cycle during the fast response time period and a low power consumption frame-listening cycle during the low power consumption time period; sending, by the server, a first frame-listening cycle modification command through a base station before the fast response time period or the low power consumption time period of the fixed frame-listening cycle, so that the electronic shelf label modifies a current frame-listening cycle according to the first frame-listening cycle modification command; and sending, by the server, a second frame-listening cycle modification command through the base station when the server is to issue the fast response service during the low power consumption time period, so that the electronic shelf label modifies the current frame-listening cycle to the fast frame-listening cycle according to the second frame-listening cycle modification command.

DETAILED DESCRIPTION

For a clearer understanding of the objectives, technical features and effects of the embodiments of the present disclosure, a clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Aiming at the deficiencies in the prior art, the present disclosure provides a method for adjusting a frame-listening cycle, a shelf label system, and a computer device, which solve the problem in the prior art that an electronic shelf label cannot simultaneously satisfy the requirements of high real-time performance and low power consumption. According to the present disclosure, a fixed frame-listening cycle of an electronic shelf label is configured by predicting an issuance time period of each service, and a fast response service corresponds to a fast frame-listening cycle and a non-fast response service corresponds to a low power consumption frame-listening cycle, so that the electronic shelf label can not only respond to the fast response service in real time, but also keep the low power consumption of a long frame-listening cycle, thereby simultaneously satisfying the requirements of high real-time performance and low power consumption of the electronic shelf label.

According to some examples, the present disclosure provides a method for adjusting a frame-listening cycle, which specifically includes the following embodiments.

Figure 1:
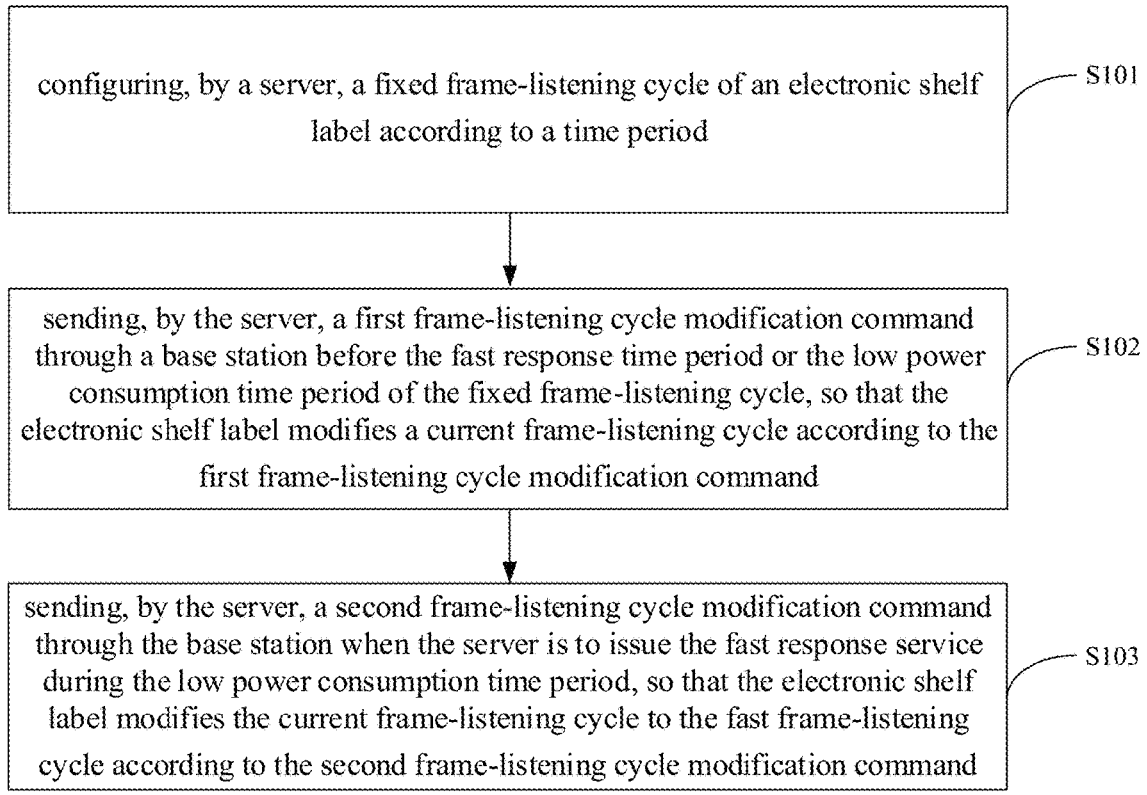
FIG. 1 illustrates a flow diagram of a method for adjusting a frame-listening cycle according to an embodiment of the present disclosure.

FIG. 1 illustrates a flow diagram of a method for adjusting a frame-listening cycle according to an embodiment of the present disclosure. As illustrated in FIG. 1, the method specifically includes:

Step S101: configuring, by a server, a fixed frame-listening cycle of an electronic shelf label according to a time period.

In the embodiment, before configuring, by the server, the fixed frame-listening cycle of the electronic shelf label according to the time period, the method further includes: predicting, by the server, an issuance time period of each service to obtain a time period matched with a service type of each service. The service type includes a fast response service and a non-fast response service.

Figure 2:
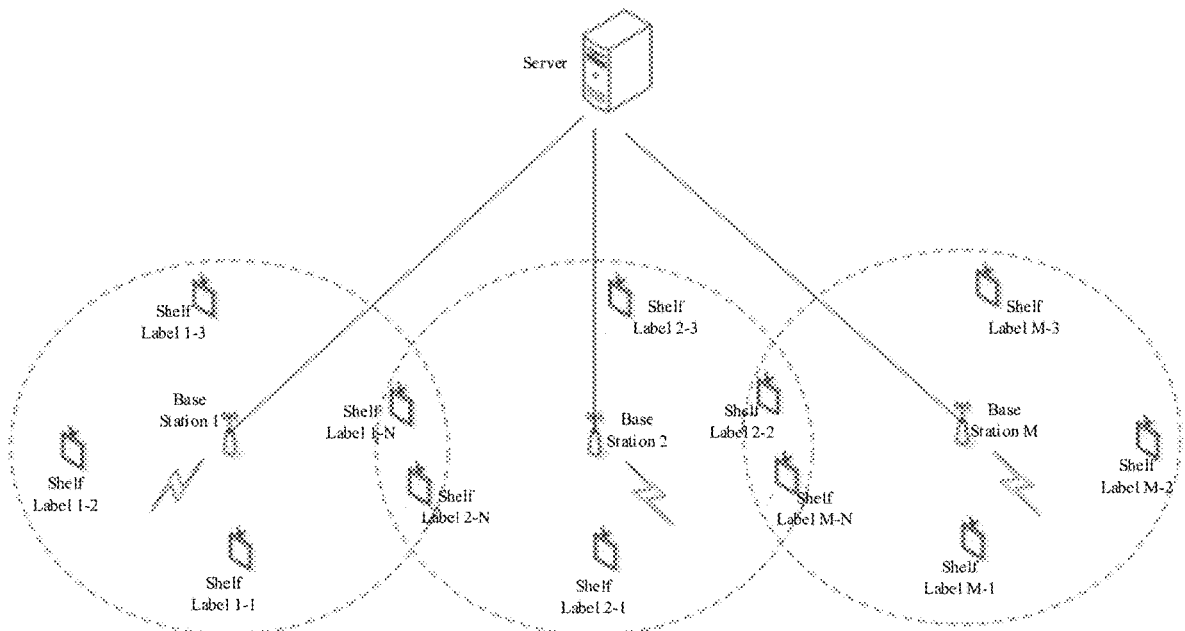
FIG. 2 illustrates a structural diagram of a shelf label system according to an embodiment of the present disclosure.

In the embodiment, the method for adjusting the frame-listening cycle is applied to a shelf label system as illustrated in FIG. 2, which includes a server, a plurality of base stations and a plurality of electronic shelf labels. The server sends control signals or service data signals to the electronic shelf labels through the base stations, so that the electronic shelf labels perform corresponding operations or update corresponding display contents.

Figure 3:
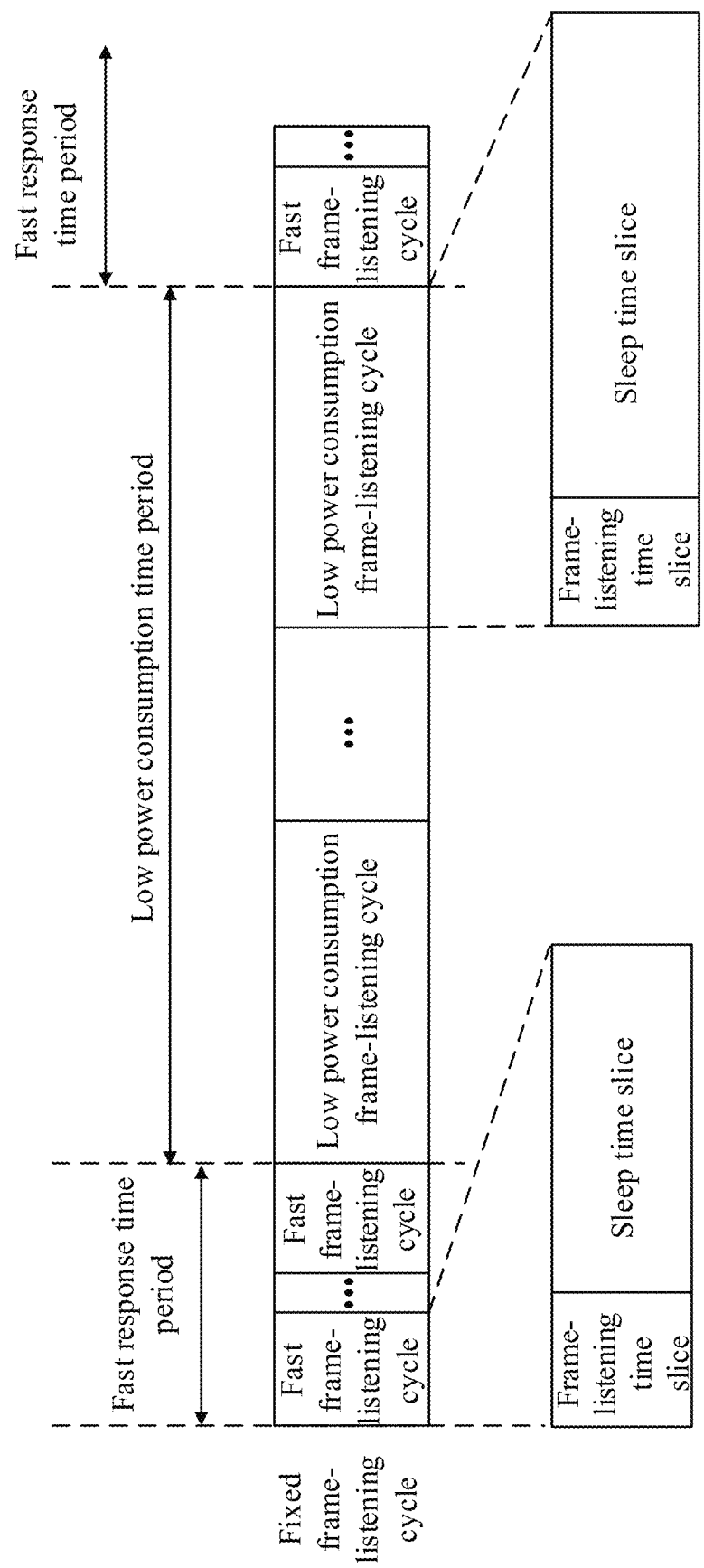
FIG. 3 illustrates a timing diagram of a fixed frame-listening cycle according to an embodiment of the present disclosure.

In the embodiment, the service type includes a fast response service and a non-fast response service. The fast response service includes, but is not limited to, a picking light-flashing service and a commodity binding service. The non-fast response service includes, but is not limited to, a commodity attribute modification service and a shelf label page switching service. As illustrated in FIG. 3, a prediction time period includes a fast response time period for issuing the fast response service and a low power consumption time period for issuing the non-fast response service.

Further, as illustrated in FIG. 3, the fixed frame-listening cycle includes a fast frame-listening cycle during the fast response time period and a low power consumption frame-listening cycle during the low power consumption time period. The fast frame-listening cycle and the low-power consumption frame-listening cycle each includes a frame-listening time slice for signal reception and a sleep time slice for sleeping. The sleep time slice of the low power consumption frame-listening cycle is longer than that of the fast frame-listening cycle.

In the embodiment, the issuance time period of each service may be a fixed time period set by the staff according to the actual service issuance requirement. For example, a picking light-flashing service occurs from 6:00 am to 8:00 am, and a light-flashing speed is required to be less than 3 s since the service type of the picking light-flashing service belongs to the fast response service. Therefore, the background control scheduling system, i.e., the server, may configure the time period from 6:00 am to 8:00 am as a fast response time period with a frame-listening cycle of 2 s, and configure other time periods as low power consumption time periods with a frame-listening cycle of 16 s.

Step S102: sending, by the server, a first frame-listening cycle modification command through the base station before the fast response time period or the low power consumption time period of the fixed frame-listening cycle, so that the electronic shelf label modifies a current frame-listening cycle according to the first frame-listening cycle modification command.

In combination with the above example, it should be noted that before 6:00 am, the background control scheduling system sends the first frame-listening cycle modification command through the base station. All of the electronic shelf labels, upon receipt of the command, modify the current frame-listening cycle from 16 s to 2 s. Before 8:00 am, the background control scheduling system sends the first frame-listening cycle modification command again through the base station. All of the electronic shelf labels, upon receipt of the command, modify the current frame-listening cycle from 2 s to 16 s. This dynamic adjustment method of the frame listening achieves the effects that the power consumption is several times lower than that of the constant frame-listening cycle of 2 s, and the real-time performance is several times faster than that of the constant frame-listening cycle of 16 s, thereby satisfying the requirements of real-time performance and low power consumption.

step S103: sending, by the server, a second frame-listening cycle modification command through the base station when the server is to issue the fast response service during the low power consumption time period, so that the electronic shelf label modifies the current frame-listening cycle to the fast frame-listening cycle according to the second frame-listening cycle modification command.

Figure 4:
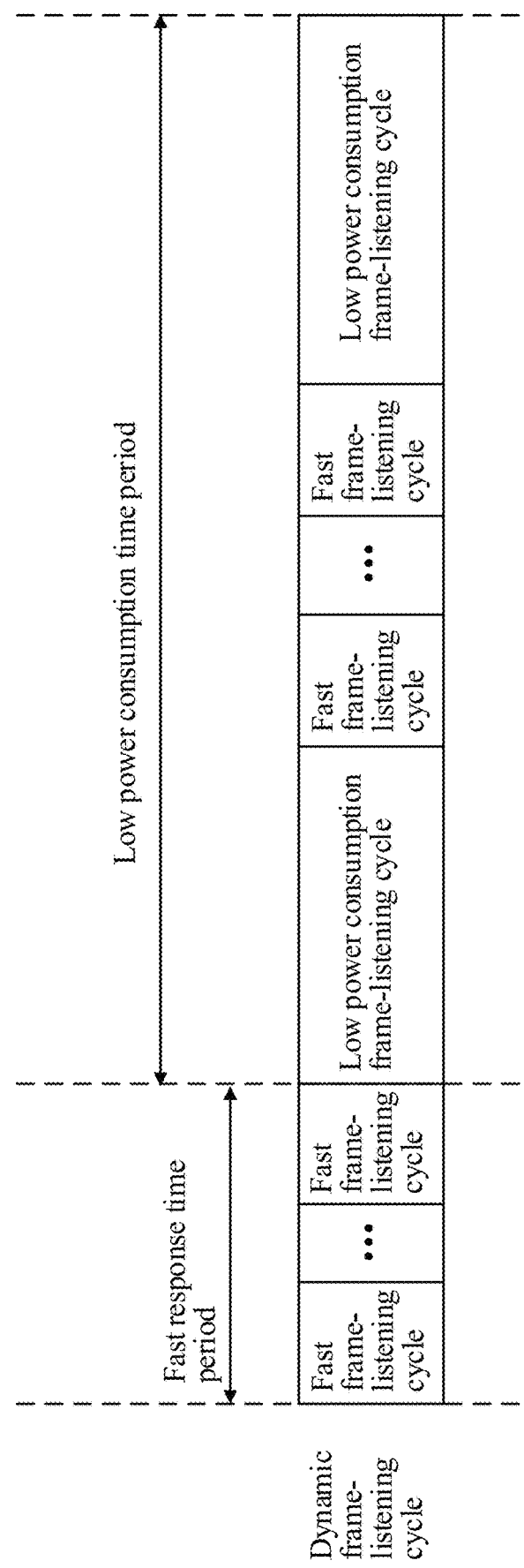
FIG. 4 illustrates a timing diagram of a dynamic frame-listening cycle according to an embodiment of the present disclosure.

In the embodiment, in order to respond to the emergency of the fast response service in real time, the server adjusts the fixed frame-listening cycle of the electronic shelf label to the dynamic frame-listening cycle as illustrated in FIG. 4 by issuing the second frame-listening cycle modification command. That is, when the server needs to temporarily issue the fast response service during the low power consumption time period, the server sends the second frame-listening cycle modification command to the electronic shelf label through the base station before issuing the fast response service, so that the electronic shelf label modifies the low power consumption frame-listening cycle to the fast frame-listening cycle upon receiving of the second frame-listening cycle modification command during the frame-listening time slice in the low power consumption frame-listening cycle. As a result, the electronic shelf label can respond to the emergency of the fast response service in time.

Compared with the prior art, this embodiment has the following advantageous effects:

1. According to the present disclosure, a fixed frame-listening cycle of an electronic shelf label is configured by predicting an issuance time period of each service, and a fast response service corresponds to a fast frame-listening cycle and a non-fast response service corresponds to a low power consumption frame-listening cycle, so that the electronic shelf label can not only respond to the fast response service in real time, but also keep the low power consumption of a long frame-listening cycle, thereby simultaneously satisfying the requirements of high real-time performance and low power consumption of the electronic shelf label.

2. According to the present disclosure, the server issues a second frame-listening cycle modification command during the low power consumption time period, so that the electronic shelf label modifies the current frame-listening cycle to the fast frame-listening cycle according to the command, and receives and responds to the fast response service issued during the low power consumption time period in time. As a result, the electronic shelf label can respond to the emergency of the fast response service in time, thereby further satisfying the requirements of high real-time performance and low power consumption, and improving the stability of the shelf label system in data communications.

In another embodiment of the present disclosure, after sending, by the server, a frame-listening cycle modification command through the base station, the method further includes: sending, by the server, a broadcast message including the current frame-listening cycle to the base station according to a preset broadcast cycle, so that the base station broadcasts the broadcast message to the electronic shelf label, and the electronic shelf label modifies the frame-listening cycle of the current time period according to the current frame-listening cycle in the broadcast message.

It should be noted that when the fixed frame-listening cycle is configured or adaptively modified to the dynamic frame-listening cycle, a periodic broadcast message including frame-listening cycle parameters is accompanied, so that the electronic shelf label that has not received the first frame-listening cycle modification command or the second frame-listening cycle modification command can receive the periodic broadcast message, thereby enabling the electronic shelf label to modify the frame-listening cycle in time. For example, after the first frame-listening cycle modification command is issued at 6:00 am, the background control scheduling system may broadcast a broadcast message every 3 minutes to all of the base stations to inform that the current frame-listening cycle is 2 s, and then the base stations broadcast the broadcast message to all of the shelf labels, so as to avoid the situation that some of the shelf labels do not successfully receive the first frame-listening cycle modification command that has been sent. The periodic broadcasting enables multiple receptions by the shelf labels, so that the modification of the frame-listening cycle by the electronic shelf label is more reliable.

In another embodiment of the present disclosure, the background control scheduling system includes an adaptive algorithm to modify the listening cycle of each electronic shelf label when a first fast service is initiated every day. After each fast service is completed, when there is no fast service for a certain delay, all of the frame-listening cycles are modified again. For example, when a first light-flashing service occurs at 6:00 am, the background control scheduling system sends an instruction to globally modify the frame-listening cycle through an AP, and when all of the electronic shelf labels receive the instruction, the frame-listening cycle is modified to 2 s. This lasts from 6:00 am to 6:00 pm, and there is a light-flashing service every hour, so the frame-listening cycle remains unchanged at 2 s. However, after 6:00 pm, when there is no light-flashing service for one hour, the background control scheduling system sends the instruction to globally modify the frame-listening cycle through the AP, and when all of the electronic shelf labels receive the instruction, the frame-listening cycle is modified to 16 s.

In another embodiment of the present disclosure, the method further includes: modifying, by the electronic shelf label, the frame-listening cycle of the current time period to the fast frame-listening cycle upon receipt of an external trigger signal.

Alternatively, when the electronic shelf label includes a touch sensor and a main controller connected to the touch sensor, modifying, by the electronic shelf label, the frame-listening cycle of the current time period to the fast frame-listening cycle upon receipt of the external trigger signal includes: sending a frame-listening cycle modification signal, in response to the touch sensor acquiring a touch signal; modifying, by the main controller, the frame-listening cycle of the current time period to the fast frame-listening cycle according to the frame-listening cycle modification signal; and sending, by the master controller, a heartbeat signal including the current frame-listening cycle to the base station, so that the base station sends the current frame-listening cycle of the electronic shelf label to the server.

It should be noted that the circuit of the electronic shelf label is provided with a sensor capable of receiving an external trigger signal. The sensor sends the trigger signal to the main controller of the electronic shelf label, and the main controller detects the trigger signal and modifies the frame-listening cycle. For example, the circuit of the electronic shelf label is provided with a sensor capable of being touched to change physical characteristics such as resistance or capacitance. When a person touches a characteristic area of the electronic shelf label, the main controller can receive the signal, thereby adjusting the frame-listening cycle of the electronic shelf label to a faster cycle, such as 2 s, and continuously sending several heartbeat signals to the base station. The base station informs the background control scheduling system that its frame-listening cycle has been accelerated, expecting to more quickly complete tasks such as receiving data or commands that may be sent from the base station subsequently. These tasks may correspond to page turning, binding, lighting-on, lighting-off, etc. The electronic shelf label may be delayed for certain time such as one hour, and if the sensor does not send the trigger signal again, the frame-listening cycle will automatically return to the slow state, such as 16 s.

Alternatively, when the electronic shelf label includes a key, a key detection circuit, and a main controller connected to the key detection circuit, modifying, by the electronic shelf label, the frame-listening cycle of the current time period to the fast frame-listening cycle upon receipt of the external trigger signal includes: sending a frame-listening cycle modification signal, in response to the key detection circuit acquiring a key trigger signal; modifying, the main controller, the frame-listening cycle of the current time period to the fast frame-listening cycle according to the frame-listening cycle modification signal; and sending, by the master controller, a heartbeat signal including the current frame-listening cycle to the base station, so that the base station sends the current frame-listening cycle of the electronic shelf label to the server.

It should be noted that the electronic shelf label is provided with a circuit for detecting the key. When a person presses the key of the electronic shelf label, similarly, the main controller adjusts the frame-listening cycle of the electronic shelf label to a faster cycle, such as 2 s, and then synchronizes the fast heartbeat signal to the background, expecting to complete the subsequent service more quickly.

Alternatively, when the electronic shelf label includes an infrared sensor, a near-field communication (NFC) acquisition module, and a main controller connected to the infrared sensor and the NFC acquisition module, modifying, by the electronic shelf label, the frame-listening cycle of the current time period to the fast frame-listening cycle upon receipt of the external trigger signal includes: sending a frame-listening cycle modification signal, in response to the infrared sensor acquiring a human body approaching signal or the NFC acquisition module acquiring an NFC communication signal; modifying, by the main controller, the frame-listening cycle of the current time period to the fast frame-listening cycle according to the frame-listening cycle modification signal; and sending, by the master controller, a heartbeat signal including the current frame-listening cycle to the base station, so that the base station sends the current frame-listening cycle of the electronic shelf label to the server. In some examples, the NFC acquisition module may be an NFC acquisition circuit.

It should be noted that the electronic shelf label is provided with a sensor for detecting human body infrared rays, and when a person approaches the electronic shelf label, the main controller repeats the above operation of adjusting the frame-listening cycle to complete the adjustment activity. For another example, the electronic shelf label is provided with an NFC circuit, and when an NFC reader of a mobile device approaches the electronic shelf label, the near-field energy wakes up the main controller of the electronic shelf label, and the main controller may repeat the above operation of adjusting the frame-listening cycle to complete the whole adjustment procedure and activity. For still another example, the electronic shelf label is provided with a sensor for sound energy or light energy, etc., and when the sound energy or the light energy exceeds a certain threshold, a trigger signal is sent to the main control circuit, and the main control circuit may repeat the above operation of modifying the frame-listening cycle to complete the task. The sensor circuits listed above may be existed alone or in combination on a certain electronic shelf label, and the main controller may detect the signals of these circuits jointly to complete the modification operation of the frame-listening cycle jointly.

In still another embodiment of the present disclosure, predicting, by the server, the issuance time period of each service to obtain the time period matched with a service type includes: establishing a linear function including a weight and an offset based on the service type and the issuance time period; fitting the linear function based on a training sample set and a least square method to calculate the weight and the offset; obtaining a target prediction function based on the weight and the offset; inputting each service into the target prediction function for prediction to obtain a time period matched with each service type.

Alternatively, an equation for fitting the linear function based on the training sample set and the least square method to calculate the weight and the offset is:

$$M = \sum_{i=1} (y^i - f(x^i: w, b))^2$$

where y represents a time period, x represents a service type, w represents a weight, b represents an offset, $f(x^i:w,b)$ represents linear function, m represents mean square error, and $i \leq 2$.

Accordingly to some examples, the present disclosure provides a system for adjusting a frame-listening cycle, which specifically includes the following embodiments.

In the embodiment, the shelf label system includes a server, a base station and an electronic shelf label.

The server is configured to predict an issuance time period of each service to obtain a time period matched with a service type of each service. The service type includes a fast response service and a non-fast response service. The time period includes a fast response time period for issuing a fast response service and a low power consumption time period for issuing a non-fast response service.

The server is further configured to configure a fixed frame-listening cycle of the electronic shelf label according to the predicted time period. The fixed frame-listening cycle includes a fast frame-listening cycle during the fast response time period and a low power consumption frame-listening cycle during the low power consumption time period.

The server is configured to send a first frame-listening cycle modification command through the base station before the fast response time period or the low power consumption time period of the fixed frame-listening cycle, so that the electronic shelf label modifies a current frame-listening cycle according to the first frame-listening cycle modification command.

The server is configured to send a second frame-listening cycle modification command through the base station when the server is to issue a fast response service during the low power consumption time period, so that the electronic shelf label modifies the current frame-listening cycle to the fast frame-listening cycle according to the second frame-listening cycle modification command.

According to some examples, the present disclosure provides a computer device, including a memory, a processor and a computer program stored in the memory and executable on the processor. The processor is configured to execute the computer program to implement the steps of: configuring, by a server, a fixed frame-listening cycle of an electronic shelf label according to a time period, with the time period including a fast response time period for issuing a fast response service and a low power consumption time period for issuing a non-fast response service, and the fixed frame-listening cycle including a fast frame-listening cycle during the fast response time period and a low power consumption frame-listening cycle during the low power consumption time period; sending, by the server, a first frame-listening cycle modification command through a base station before the fast response time period or the low power consumption time period of the fixed frame-listening cycle, so that the electronic shelf label modifies a current frame-listening cycle according to the first frame-listening cycle modification command; and sending, by the server, a second frame-listening cycle modification command through the base station when the server is to issue the fast response service during the low power consumption time period, so that the electronic shelf label modifies the current frame-listening cycle to the fast frame-listening cycle according to the second frame-listening cycle modification command.

According to some examples, the present disclosure provides a readable storage medium storing a computer program is stored, when being executed by a processor, the computer program implements the steps of: configuring, by a server, a fixed frame-listening cycle of an electronic shelf label according to a time period, with the time period including a fast response time period for issuing a fast response service and a low power consumption time period for issuing a non-fast response service, and the fixed frame-listening cycle including a fast frame-listening cycle during the fast response time period and a low power consumption frame-listening cycle during the low power consumption time period; sending, by the server, a first frame-listening cycle modification command through a base station before the fast response time period or the low power consumption time period of the fixed frame-listening cycle, so that the electronic shelf label modifies a current frame-listening cycle according to the first frame-listening cycle modification command; and sending, by the server, a second frame-listening cycle modification command through the base station when the server is to issue the fast response service during the low power consumption time period, so that the electronic shelf label modifies the current frame-listening cycle to the fast frame-listening cycle according to the second frame-listening cycle modification command.

Those of ordinary skills in the art can understand that all or part of the flows in the aforementioned method embodiments can be completed by instructing relevant hardware through a computer program that may be stored in a non-volatile computer-readable storage medium, and when executed, the program can include the flows of the aforementioned method embodiments. In which, any reference to a memory, a storage, a database or any other medium adopted in the embodiments of the present disclosure can include a nonvolatile memory and/or a volatile memory. The nonvolatile memory may include a read-only memory (ROM), a programmable ROM (PROM), an electrically programmable ROM (EPROM), an electrically erasable programmable ROM (EEPROM) or a flash memory. The volatile memory may include a random-access memory (RAM) or an external cache memory. By way of illustration rather than limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synch-link DRAM (SLDRAM), a memory bus (Rambus) direct RAM (RDRAM), a direct memory bus dynamic RAM (DRDRAM) and a memory bus dynamic RAM (RDRAM).

It should be noted that herein, the relational terms such as 'first' and 'second' are only used to distinguish one entity or operation from another entity or operation, and do not necessarily require or imply any such actual relationship or sequence between these entities or operations. In addition, the term "comprise," "include," or any other variation thereof is intended to cover non-exclusive inclusions, so that a process, method, article or device that includes a series of elements includes not only those elements, but also other elements not explicitly listed, or further includes elements inherent to such process, method, article or device. Without further restrictions, an element defined by a statement "comprising a . . . " does not exclude the existence of other identical elements in a process, method, article or device that includes said element.

What is claimed is:

1. A shelf label system, comprising:
   a server, a base station, and an electronic shelf label;
   wherein the server is configured to:
   configure a fixed frame-listening cycle of the electronic shelf label, wherein the fixed frame-listening cycle comprises a fast frame-listening cycle and a low power consumption frame-listening cycle; and
   send to the electronic shelf label at least one frame-listening cycle modification command through the base station.

2. The shelf label system according to claim 1, wherein the server is further configured to:
   predict an issuance time period of at least one service to obtain a time period matching with at least one service type corresponding to the at least one service, wherein the at least one service type comprises a fast response service and a non-fast response service.

3. The shelf label system according to claim 1, wherein the server is configured to:
   configure the fixed frame-listening cycle of the electronic shelf label according to a time period, wherein the fixed frame-listening cycle comprises the fast frame-listening cycle during a fast response time period and the low power consumption frame-listening cycle during a low power consumption time period; and
   perform at least one of following acts:
   sending a first frame-listening cycle modification command through the base station before the fast response time period or the low power consumption time period of the fixed frame-listening cycle; or sending, in response to issuing a fast response service during the low power consumption time period, a second frame-listening cycle modification command through the base station.

4. The shelf label system according to claim 3, wherein the server is further configured to perform at least one of following acts:

modifying a current frame-listening cycle according to the first frame-listening cycle modification command; or modifying the current frame-listening cycle to the fast frame-listening cycle according to the second frame-listening cycle modification command.

5. The shelf label system according to claim 1, wherein the server is further configured to send a broadcast message comprising a current frame-listening cycle to the base station according to a preset broadcast cycle and instruct the base station to broadcast the broadcast message to the electronic shelf label; and wherein the electronic shelf label is configured to modify a frame-listening cycle of a current time period according to the current frame-listening cycle in the broadcast message.

6. The shelf label system according to claim 1, wherein the electronic shelf label is configured to:

modify a frame-listening cycle of a current time period to the fast frame-listening cycle in response to receiving an external trigger signal.

7. The shelf label system according to claim 6, wherein the electronic shelf label comprises a touch sensor and a main controller connected to the touch sensor;

wherein the touch sensor is configured to send a frame-listening cycle modification signal in response to acquiring a touch signal;

wherein the main controller is configured to modify the frame-listening cycle of the current time period to the fast frame-listening cycle according to the frame-listening cycle modification signal; and wherein the main controller is configured to send a heartbeat signal comprising the current frame-listening cycle to the base station, and instruct the base station to send the current frame-listening cycle of the electronic shelf label to the server.

8. The shelf label system according to claim 6, wherein the electronic shelf label comprises a key, a key detection circuit, and a main controller connected to the key detection circuit;

wherein the key detection circuit is configured to send a frame-listening cycle modification signal in response to acquiring a key trigger signal;

wherein the main controller is configured to modify the frame-listening cycle of the current time period to the fast frame-listening cycle according to the frame-listening cycle modification signal; and wherein the main controller is configured to send a heartbeat signal comprising the current frame-listening cycle to the base station, and instruct the base station to send the current frame-listening cycle of the electronic shelf label to the server.

9. The shelf label system according to claim 6, wherein the electronic shelf label comprises an infrared sensor, a near-field communication (NFC) acquisition circuit, and a main controller connected to the infrared sensor and the NFC acquisition circuit;

wherein the infrared sensor is configured to send a frame-listening cycle modification signal in response to acquiring a human body approaching signal or in response to determining that the NFC acquisition circuit acquires an NFC communication signal;

wherein the main controller is configured to modify the frame-listening cycle of the current time period to the fast frame-listening cycle according to the frame-listening cycle modification signal; and wherein the main controller is configured to send a heartbeat signal comprising the current frame-listening cycle to the base station, and instruct the base station to send the current frame-listening cycle of the electronic shelf label to the server.

10. A method for adjusting a frame-listening cycle, comprising:

configuring, by a server in a shelf label system, a fixed frame-listening cycle of an electronic shelf label in the shelf label system, wherein the fixed frame-listening cycle comprises a fast frame-listening cycle and a low power consumption frame-listening cycle; and sending, by the server and to the electronic shelf label, at least one frame-listening cycle modification command through a base station in the shelf label system.

11. The method according to claim 10, further comprising:

predicting, by the server, an issuance time period of at least one service to obtain a time period matching with at least one service type corresponding to the at least one service, wherein the at least one service type comprises a fast response service and a non-fast response service.

12. The method according to claim 10, wherein sending, by the server, at least one frame-listening cycle modification command comprises at least one of following acts:

sending, by the server, a first frame-listening cycle modification command through the base station, so that the electronic shelf label modifies a current frame-listening cycle according to the first frame-listening cycle modification command; or sending, by the server, a second frame-listening cycle modification command through the base station, so that the electronic shelf label modifies the current frame-listening cycle to the fast frame-listening cycle according to the second frame-listening cycle modification command.

13. The method according to claim 10, further comprising:

sending, by the server, a broadcast message comprising a current frame-listening cycle to the base station according to a preset broadcast cycle, and instructing, by the server, the base station to broadcast the broadcast message to the electronic shelf label; and modifying, by the electronic shelf label, a frame-listening cycle of a current time period according to the current frame-listening cycle in the broadcast message.

14. The method according to claim 10, wherein the electronic shelf label modifies a frame-listening cycle of a current time period to the fast frame-listening cycle in response to receiving an external trigger signal.

15. The method according to claim 14, wherein the electronic shelf label comprises a touch sensor and a main controller connected to the touch sensor;

wherein the touch sensor sends a frame-listening cycle modification signal in response to acquiring a touch signal;

wherein the main controller modifies the frame-listening cycle of the current time period to the fast frame-listening cycle according to the frame-listening cycle modification signal; and wherein the main controller sends a heartbeat signal comprising the current frame-listening cycle to the base station, and instructs the base station to send the current frame-listening cycle of the electronic shelf label to the server.

16. The method according to claim 14, wherein the electronic shelf label comprises a key, a key detection circuit, and a main controller connected to the key detection circuit;

wherein the key detection circuit sends a frame-listening cycle modification signal in response to acquiring a key trigger signal;

wherein the main controller modifies the frame-listening cycle of the current time period to the fast frame-listening cycle according to the frame-listening cycle modification signal; and wherein the main controller sends a heartbeat signal comprising the current frame-listening cycle to the base station, and instructs the base station to send the current frame-listening cycle of the electronic shelf label to the server.

17. The method according to claim 14, wherein the electronic shelf label comprises an infrared sensor, a near-field communication (NFC) acquisition circuit, and a main controller connected to the infrared sensor and the NFC acquisition circuit;

wherein the infrared sensor sends a frame-listening cycle modification signal in response to acquiring a human body approaching signal or in response to determining that the NFC acquisition circuit acquires an NFC communication signal;

wherein the main controller modifies the frame-listening cycle of the current time period to the fast frame-listening cycle according to the frame-listening cycle modification signal; and wherein the main controller sends a heartbeat signal comprising the current frame-listening cycle to the base station, and instructs the base station to send the current frame-listening cycle of the electronic shelf label to the server.

18. A non-transitory computer readable storage medium storing a plurality of programs for execution by a server having one or more processors, wherein the plurality of programs, when executed by the one or more processors, cause the server to perform acts comprising:

configuring a fixed frame-listening cycle of an electronic shelf label in a shelf label system, wherein the fixed frame-listening cycle comprises a fast frame-listening cycle and a low power consumption frame-listening cycle; and sending to the electronic shelf label at least one frame-listening cycle modification command through a base station in the shelf label system.

19. The non-transitory computer readable storage medium according to claim 18, wherein the server is further caused to perform at least one of following acts:

sending a first frame-listening cycle modification command through the base station, so that the electronic shelf label modifies a current frame-listening cycle according to the first frame-listening cycle modification command; or sending a second frame-listening cycle modification command through the base station, so that the electronic shelf label modifies the current frame-listening cycle to the fast frame-listening cycle according to the second frame-listening cycle modification command.

20. The non-transitory computer readable storage medium according to claim 18, wherein the server is further caused to perform at least one of following acts:

predicting an issuance time period of at least one service to obtain a time period matching with at least one service type corresponding to the at least one service, wherein the at least one service type comprises a fast response service and a non-fast response service; or sending a broadcast message comprising a current frame-listening cycle to the base station according to a preset broadcast cycle, and instructing the base station to broadcast the broadcast message to the electronic shelf label; and modifying, by the electronic shelf label, a frame-listening cycle of a current time period according to the current frame-listening cycle in the broadcast message.

* * * * *